Patented Jan. 13, 1931

1,789,121

UNITED STATES PATENT OFFICE

MAX JOSEPH THEUMANN, OF LYON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS FOR COLORING CELLULOSE ESTERS AND ETHERS

No Drawing. Application filed July 29, 1927, Serial No. 209,398, and in France August 3, 1926.

This invention relates to a process for preparing colored cellulose esters and ethers and it has for its object an improved process for preparing these substances.

The coloring of plastic materials is generally performed by adding to these materials. During their manufacture, an organic coloring matter, which may or may not be soluble in the solvents employed. In this manner colored plastic materials are obtained which are transparent or translucent, according to their thickness, but the color of which does not withstand the sustained action of light or heat. In order to avoid this drawback, powdered pigments may be used, but the distribution of these pigments in the gelatinized mass necessitates a protracted mechanical treatment without being conducive to a perfect homogeneity.

According to this invention I provide a process for preparing colored cellulose esters and ethers by producing by chemical reaction a mineral coloring matter in the midst of a solution of the said ester or ether in an organic solvent, and in subsequently precipitating from the solution the colored cellulose ester or ether by pouring the solution into a liquid which dissolves or is miscible with the solvent, but in which both the ester or ether and the produced coloring matter are insoluble, then washing in order to eliminate the secondary products of the chemical reaction and eventually drying the colored cellulose ester or ether. The colored cellulose ester or ether so obtained is then used for the preparation of plastic materials; celluloid, varnish, films, fibres and the like, by adopting any of the usual methods employed in this industry.

This process may be carried out as follows:

The reagents necessary for the formation of the coloring matter are introduced progressively, while stirring, in the form of solution, or any other form, either simultaneously or successively, into a solution of the cellulose ester or ether. This solution can be chosen in a state of suitable dilution and fluidity, so as to render the distribution in the fluid very easy and homogeneous. When the reaction is completed, the colored solution is poured into a liquid, which is miscible with the solvent but in which both the ether or ester and the produced coloring matter are insoluble.

During the precipitation phase of the process, the cellulose ester or ether assimilates, so to speak, the coloring material, in the extremely divided state in which it is, this being done under such conditions that the homogeneity of the resulting mass may be said to be absolutely perfect.

The product is then freed by washing from it all the secondary products of the reaction, and then dried.

This cellulose ether or ester can then be employed in the preparation of plastic materials without any particular precautions and without any modifications in the usual manufacturing processes generally, and in the duration of the mechanical treatments in particular.

This process allows of the coloring of cellulose esters and ethers by means of all the coloring matters, whether prepared by simple reaction, double decomposition, or otherwise.

The plastic material obtained when starting from cellulose esters and ethers colored according to the process, herein described, exhibit definite differences from those obtained from esters and ethers colored by the addition of a powdered pigment in as finely divided a state as it is possible to obtain.

For the same proportion of pigment, they are transparent or translucent in much greater thicknesses; they are, moreover, of superior quality mechanically.

The manner of carrying out the present process will be clearly understood from the following examples which are not by any means limitative.

*Example I:* 100 grammes of cellulose acetate are dissolved in 500 grammes of acetone and a concentrated solution of 5 grammes of ferric chloride is added while stirring. When the mixture is homogeneous, 6.5 grammes of potassium ferrocyanide in aqueous solution are added, the stirring being continued meanwhile; Prussian blue is formed in an extremely divided state. When the reaction is completed, the solution is poured into water, the cellulose acetate is precipitated blue-colored, washed with water and dried.

*Example II:* 16 grammes of cadmium sulphate are introduced while stirring into 1000 ccm. of an acetic acetylating solution containing 200 grammes of cellulose acetate. When the mixture is homogeneous, a solution of 6 grammes of sodium sulphide is slowly added; cadmium sulphide in a very divided state is formed. The yellow-colored acetate is precipitated in water, washed and dried.

In the above examples, the composition of the solvent and the reagents may be modified as stated above. The cellulose acetate may be replaced by other cellulose esters or ethers for which a suitable solvent and precipitating liquid will be used.

The esters and ethers treated by the process, herein described, may be utilized, either alone, or mixed with cellulose esters and ethers which have not been colored, or which have been differently colored by the same process or in any other way; new shades may be obtained in this manner.

The cellulose esters and ethers colored by the process above described permit one to prepare solutions which can be spread in the form of varnish, cast in thin transparent colored films, or spun in the form of textile colored threads. They can also be worked like celluloid in sheets, tubes or sticks, transparent or translucent, according to their thickness.

What I claim and desire to secure by Letters Patent is:—

1. The process of producing a colored cellulose derivative, which consists in forming a solution of the cellulose derivative to be colored, adding thereto substances capable of chemically reacting with each other to produce a mineral coloring matter, and subjecting the mass to a liquid miscible with the solvent but in which the derivative and the coloring matter are insoluble thereby to precipitate the colored cellulose derivative.

2. The process of producing a colored cellulose derivative, which consists in forming a solution of cellulose acetate, adding thereto substances capable of chemically reacting with each other to produce a mineral coloring matter, and subjecting the mass to a liquid miscible with the solvent but in which the cellulose acetate and the coloring matter are insoluble thereby to precipitate the colored cellulose acetate.

3. The process of producing a colored cellulose derivative, which consists in forming a solution of cellulose acetate in an organic solvent, adding thereto substances capable of chemically reacting with each other to produce a mineral coloring matter, and subjecting the mass to a liquid miscible with the solvent but in which the cellulose acetate and the coloring matter are insoluble thereby to precipitate the colored cellulose acetate.

4. The process of producing a colored cellulose derivative, which consists in forming a solution of cellulose acetate in an organic solvent, adding thereto substances capable of chemically reacting with each other to produce a mineral coloring matter, and pouring the mass into water to cause precipitation of the colored cellulose acetate therefrom.

5. The process of producing a colored cellulose derivative, which consists in forming a solution of cellulose acetate in acetone, separately adding thereto potassium ferrocyanide and ferric chloride, and subsequently pouring the mass into water to cause precipitation of the colored cellulose acetate therefrom.

6. The process of producing a colored cellulose derivative, which consists in dissolving cellulose acetate in acetone in the proportion of 1 to 5, adding thereto a small quantity of a concentrated solution of ferric chloride and stirring the mixture until homogeneous, adding thereto under continued stirring an aqueous solution of potassium ferrocyanide thereby to cause a chemical reaction producing Prussian blue, and pouring the mass into water to cause precipitation of the blue-colored cellulose acetate.

In testimony whereof I have signed my name to this specification.

MAX JOSEPH THEUMANN.